United States Patent [19]

Murata

[11] 4,115,00!
[45] Sep. 19, 197%

[54] METHOD FOR OPTICALLY MEASURING A ROUGHNESS PROFILE OF SURFACE

[75] Inventor: Ryoji Murata, Higashiyamato, Japan

[73] Assignee: Agency of Industrial Science & Technology, Tokyo, Japan

[21] Appl. No.: 560,189

[22] Filed: Mar. 20, 1975

[30] Foreign Application Priority Data

May 20, 1974 [JP] Japan .................................. 49-56274

[51] Int. Cl.$^2$ .............................................. G01B 11/30
[52] U.S. Cl. .......................................... 356/120; 356/4
[58] Field of Search ........................ 356/120, 109, 4, 5

[56] References Cited

U.S. PATENT DOCUMENTS

| 3,561,876 | 2/1971 | Hoffman | 356/109 |
| 3,715,165 | 2/1973 | Smith | 356/120 |
| 3,719,421 | 3/1973 | Poilleux et al. | 356/120 |
| 3,788,741 | 1/1974 | Buechler | 356/12 |

Primary Examiner—Conrad J. Clark
Attorney, Agent, or Firm—Haight & Huard

[57] ABSTRACT

A method for measuring a roughness profile of a surface optically is provided. The method essentially comprise projecting through a converging optical system a pai of light rays on a surface to be measured, the light ray being focused slightly before and behind the measurin; surface, receiving reflections of the projected light ray by photoelectric means to produce two different elec tric signals representing the intensity of the reflection: of the two light rays, detecting a roughness profile o the surface on the basis of the difference of the twc electric signals, and moving the light rays along the measuring surface to obtain a continuous roughnes; profile of the surface.

6 Claims, 11 Drawing Figures

METHOD FOR OPTICALLY MEASURING A ROUGHNESS PROFILE OF SURFACE

This invention relates to a method of optically measuring a roughness profile of a surface.

It is an object of the present invention to provide a method of measuring roughness profiles by means of simple optical and electrical devices without contacting the surface to be measured.

It is another object of the invention to provide a method of optico-electrically measuring the roughness profile of the surface, which method is capable of making corrections with regard to variations in reflection factor of surfaces to be measured.

According to the invention, there is provided a method which comprises projecting through a converging lens a pair of light rays on a surface to be measured, the light rays respectively having a focal point slightly before and behind the measuring surface receiving reflections of the projected light rays by photoelectric means to produce two separate electric signals representing the respective intensity of the reflections of the two light rays; detecting a roughness profile of the surface from the difference of the two electric signals; and moving the light rays along the measuring surface to obtain a continuous roughness profile of the surface.

In the method of the invention just-mentioned, the reflections of the two light rays may be received by two separate photosensors or simultaneously by a single photosensor. In the latter case, however, it is necessary to impart identifiable characteristics to the respective light rays as will be discussed in greater detail below.

The above and other objects, features and advantages of the invention will become clear from the following particular description and the appended claims, taken in conjunction with the accompanying drawings which show by way of example preferred embodiments of the invention.

IN THE ACCOMPANYING DRAWINGS

Figure 1:
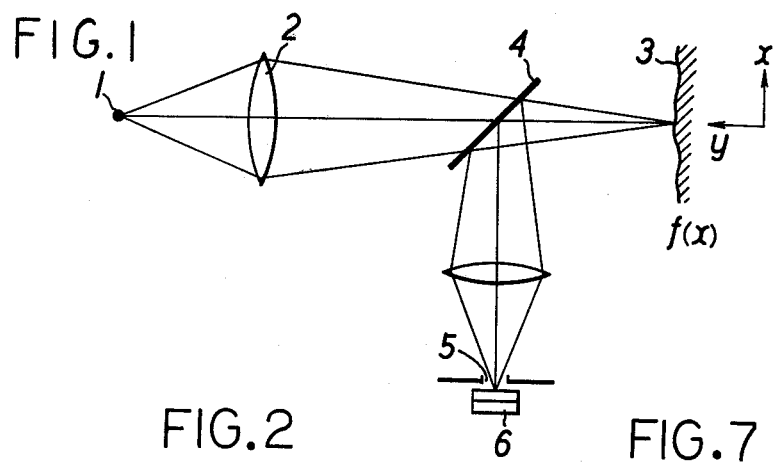
FIG. 1 is a diagrammatic view showing fundamental functions of an optical system employed in the present invention.
Figure 2:
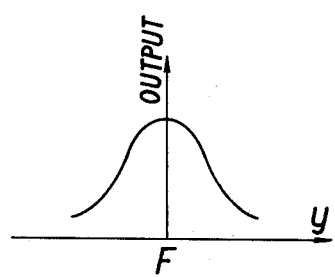
FIG. 2 is a graphical representation of variations in output energy level of the photosensor of the optical system of FIG. 1.
Figure 7:
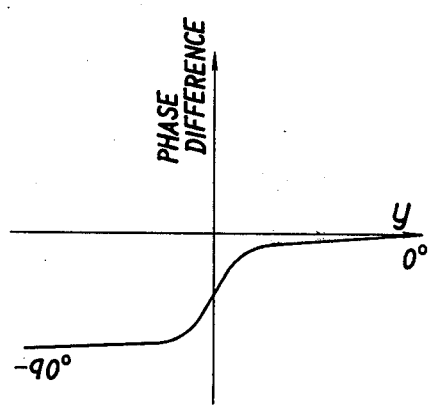
FIG. 7 is a graphical illustration of phase difference as obtained in the method of FIG. 6.

Referring to the accompanying drawings and first to FIG. 1 which is presented to explain fundamental functions of an optical system which is employed in the present invention, a light ray from a light source 1 is converged through a lens 2 to a point on a measuring surface 3. The reflection of the projected light is reflected again on a half-mirror 4 and directed toward a photosensor 6 which is adapted to produce an output in response to the intensity of light incident thereon, the output having the highest energy level when the light projected on the measuring surface 3 is in focus F and having a lower energy level when the projected light is focused before or behind the measuring surface 3, as shown particularly in FIG. 2. In the present invention a pair of optical systems of similar arrangement but of different focal distances are employed for the purpose of measuring depthwise surface variations.

Alternatively, the same purpose can be obtained by employing a pair of optical systems of the same focal distance when the pair of optical systems are arranged in different positions.

Figure 3:
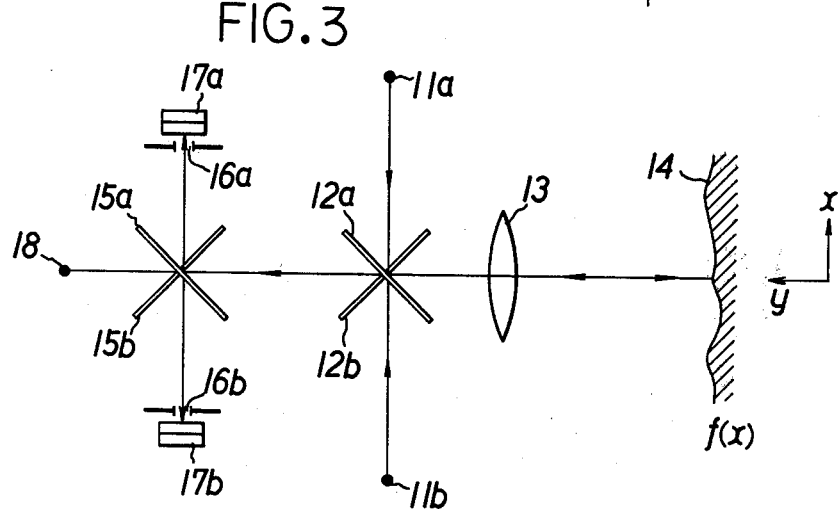
FIG. 3 is a diagrammatic view illustrating an optical surface measuring method according to the invention.

FIG. 3 shows a basic form of the surface measuring method according to the invention, in which a pair of similar optical systems are employed in juxtaposition for projecting light rays which have focal points respectively before and behind the surface to be measured. More particularly, the light ray which is projected from a light source 11a of one optical system through a half-mirror 12a and a converging lens 13 has a focal point slightly behind a measuring surface 14, while the light ray which is projected from a light source 11b of the other optical system similarly through a half-mirror 12b and lens 13 is focused slightly short of the measuring surface 14. Reflections of the two differently focused light rays are allowed to pass through the afore-mentioned lens 13 and half-mirrors 12a and 12b and, after reflection on half-mirrors 15a and 15b, to reach photosensors 17a and 17b through slits 16a and 16b, respectively. The light rays which are projected from the two optical systems through the lens 13 may be converted to a point on the measuring surface 14, or alternatively the two optical systems may be arranged to have parallel optical axes sharing halves of the view field of the lens 13. In FIG. 3, the reference numeral 18 denotes a view finder which is provided to observe the measuring surface 14 through the half-mirrors 15a and 15b.

Figure 4:
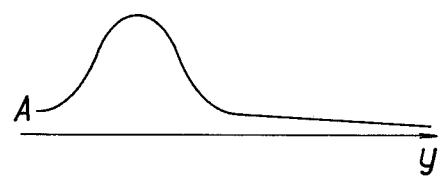
FIGS. 4A to 4E are graphical illustrations showing the manner of processing the outputs of the photosensor.
Figure 4:
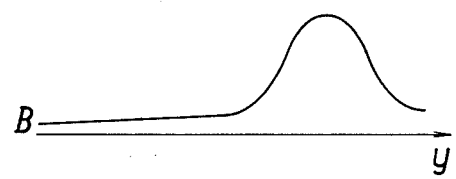
Figure 4:
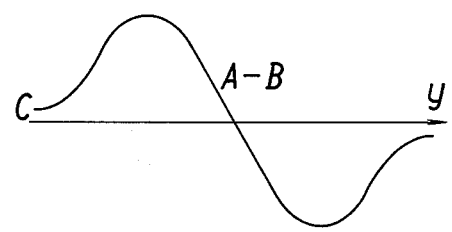
Figure 4:
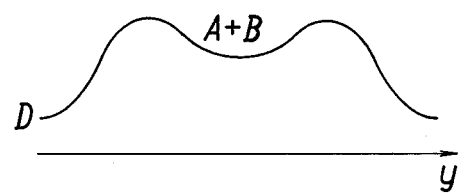
Figure 4:
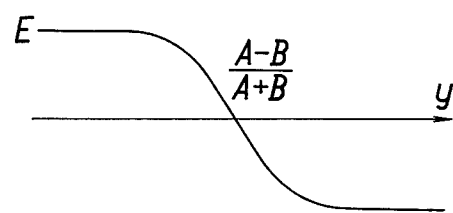

In this manner, as the light rays projected from the two optical systems are focused respectively before and behind the measuring surface 14, the energy levels of outputs of the corresponding photosensors 17a and 17b are varied as shown in FIGS. 4A and 4B, with rounded peaks at positions displaced from each other depthwise or in the direction of y. FIG. 4C shows a curve representing the difference of the two outputs, that is to say, a curve of A−B, where the energy level becomes zero at a median point between the two peaks and varies in proportion to the roughness profile in the measuring surface 14. It follows that the roughness profile of the measuring surface can be detected directly from the outputs of the photosensors 17a and 17b. A continuous roughness profile $f(x)$ can be obtained by moving the optical systems along the surface 14, for example, in the direction x.

In this connection, it is necessary to make corrections relative to the reflection factor of the surface under measurement in order to know the correct surface variations, obtaining $(A - B)/(A + B)$ from the output difference $(A - B)$ of FIG. 4C and the output sum $(A + B)$ of FIG. 4D.

Figure 5:
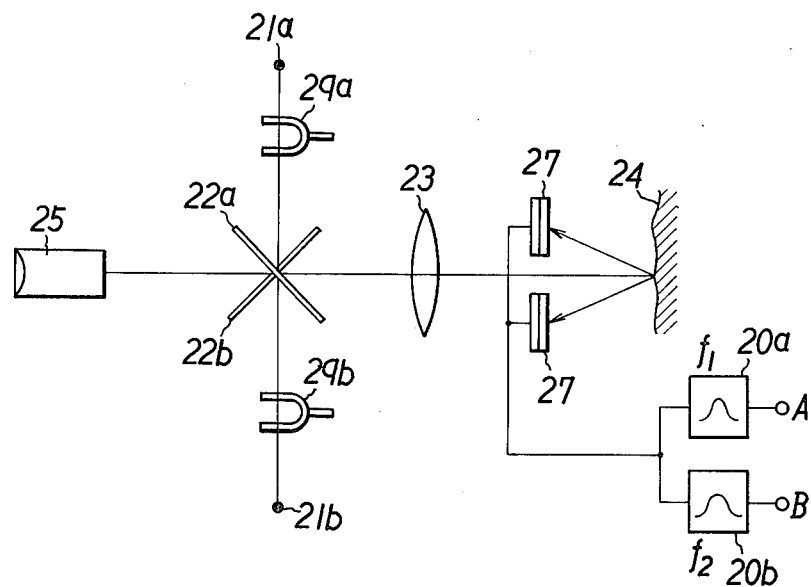
FIGS. 5 and 6 are diagrammatic views showing further embodiments of the invention.

FIG. 5 illustrates another embodiment of the invention, where a single photosensor 27 is employed commonly for the two optical systems. In this instance, in order to allow the photosensor 27 to produce two separate outputs in respect of the two differently focused light rays which are projected separately from the respective light sources 21a and 21b, the light rays are chopped respectively by choppers 29a and 29b at different frequencies $f_1$ and $f_2$ and then reflected on half-mirrors 22a and 22b for projection on the measuring surface 24 through lens 23. The two light rays which are projected through the lens 23 are likewise focused before and behind the measuring surface 24 and reflected toward one common photosensor 27. As the light rays from the sources 21a and 21b are chopped at different frequencies $f_1$ and $f_2$, the outputs of the photosensor 27 corresponding to the light rays $f_1$ and $f_2$ can be easily separated from each other by separators 20a and 20b of known construction, such as conventional band pass filters. The roughness profile of the surface can thus be obtained from the separated outputs A and B by processing them in the manner as explained in connection with the preceding embodiment.

The measuring point can be observed simultaneously during the measuring operation by providing a finder microscope 25. In this instance, the illumination for observation purposes will not cause noises in the outputs to be used for the measurement of the roughness profile. Obviously, the above-described method of the invention can be advantageously utilized in depth meters and in automatic focusing of microscopes.

Alternatively, in order to separate the outputs of the photosensor which simultaneously detects the reflections of the two differently focused light rays, the wavelength of one light ray may be differentiated from that of the other light ray. After separating the reflected light rays according to the difference in wavelength, the curve of the roughness profile is obtained in the same manner as in the preceding embodiments. The measuring point can also be clearly observed simultaneously with use of an illumination of a different wavelength.

Figure 6:
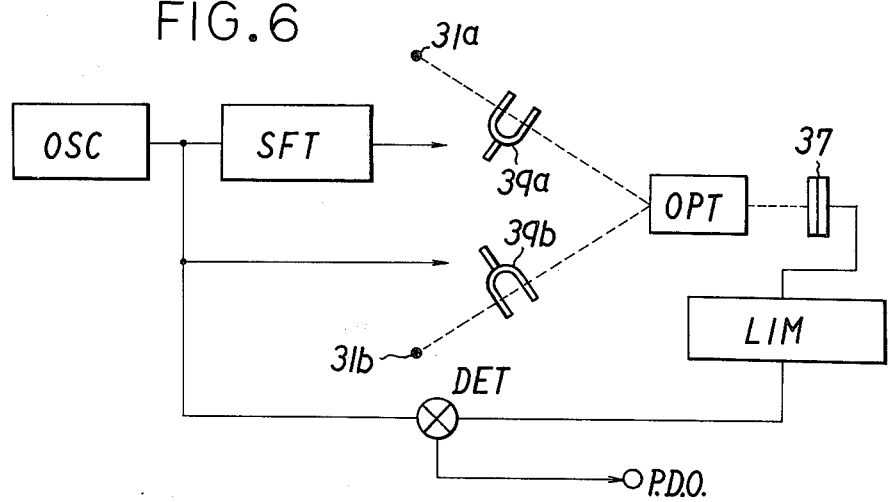

FIG. 6 shows still another embodiment of the present invention, where a pair of choppers 39a and 39b are employed in a fashion similar to the embodiment of FIG. 5. In this instance, however, the choppers 39a and 39b are of the same frequency and are adapted to produce 90° phase difference from each other so that the outputs corresponding to the two light rays may be picked up separately.

More particularly, the choppers 39a and 39b are connected to an oscillator OSC which is adapted to oscillate with certain phase. A phase shifter SFT is inserted between the oscillator OSC and the chopper 39a to cause the latter to chop the light ray from the light source 31a at a phase difference of 90°, while the other chopper 39b chops the light ray from the other light source 31b in phase with the oscillator OSC. That is to say, the choppers 39a and 39b have a 90° phase difference from each other. Therefore, the reflections of the chopped light rays which are focused respectively before and behind the measuring surface as in the preceding embodiments can be received simultaneously by a single photosensor 37 through optical system OPT, and the outputs of the photosensor 37 are fed to a phase detector DET to obtain an output propotional to phase difference which varies in proportion to roughness profile of the measuring surface of roughness in the direction $y$. Thus, the roughness profile of the measuring surface can be directly measured from the phase difference output P.D.O.

In this instance, if a phase detector DET which has amplitude limiting function or a limiter LIM is employed, it becomes possible to obtain an output which is proportional only to the phase difference and irrespective of the amplitude of the inputs, allowing to make corrections automatically for variations in reflection factor of the measuring surface.

The invention has thus far been described by way of particular examples, however, it will be understood that various modifications and changes can be added thereto without departing from the scope of the invention as defined in the appended claims.

What is claimed is:

1. A method for optically measuring a roughness profile of a surface, comprising:
   projecting through a converging optical system at least two discrete light rays from two light sources on a surface to be measured, one of said light rays being focused before and the other behind said surface;
   receiving reflections of said light rays by photoelectric means to produce two different electric signals related to the respective intensity of the reflections of said light rays, said reflections being strongest when said light rays are in focus at said surface and decreasing in intensity when said light rays are out of focus with said surface;
   detecting a roughness profile of said surface on the basis of the difference of said electric signals; and
   moving said light rays along said surface to obtain a continuous roughness profile of said surface.

2. A method as defined in claim 1, wherein said light rays to be projected on said surface are chopped at different frequencies, and said reflections of said light rays are received by a single photosensor, the output of said photosensor being separated into said two signals according to the difference in frequency.

3. A method as defined in claim 1, wherein said light rays to be projected on said surface are filtered to have different wavelengths, and the light rays are separated into said two signals according to the difference in wavelength.

4. A method as defined in claim 1, wherein said light rays to be projected on said surface are chopped at the same frequency and with a phase difference of 90° from each other, and said reflections of said light rays are received by a single photosensor, the output of which photosensor being fed to a phase detector to detect the roughness profile of said surface from the output of said detector.

5. A method as defined in claim 1, which includes observing the surface simultaneously through a view finder.

6. A method as defined in claim 2, which includes observing the surface simultaneously through a view finder.

* * * * *